US009056946B2

(12) United States Patent
Kishida et al.

(10) Patent No.: US 9,056,946 B2
(45) Date of Patent: Jun. 16, 2015

(54) METHOD FOR PRODUCING POLYLACTIC ACID (75) Inventors: Hisanori Kishida, Osaka (JP); Takashi Hasegawa, Osaka (JP); Kenji Miyaguchi, Sendai (JP); Takehiko Moriya, Sendai (JP); Nobuyoshi Nomura, Nagoya (JP); Ryohei Ogawa, Nagoya (JP)

(73) Assignees: HITACHI ZOSEN CORPORATION, Osaka-shi (JP); TOHOKU ELECTRIC POWER CO., INC., Sendai-shi (JP); NATIONAL UNIVERSITY CORPORATION NAGOYA UNIVERSITY, Nagoya-shi (JP)

( * ) Notice: Subject to any disclaimer, the term of this patent is extended or adjusted under 35 U.S.C. 154(b) by 206 days.

(21) Appl. No.: 13/704,793

(22) PCT Filed: Jun. 16, 2011

(86) PCT No.: PCT/JP2011/063811
§ 371 (c)(1),
(2), (4) Date: Feb. 28, 2013

(87) PCT Pub. No.: WO2011/158905
PCT Pub. Date: Dec. 22, 2011

(65) Prior Publication Data
US 2013/0178598 A1 Jul. 11, 2013

(30) Foreign Application Priority Data

Jun. 17, 2010 (JP) ................................. 2010-137992

(51) Int. Cl.
*C08G 63/00* (2006.01)
*C08G 63/84* (2006.01)
*C08G 63/82* (2006.01)
*C08G 63/08* (2006.01)
*C08L 101/16* (2006.01)

(52) U.S. Cl.
CPC .............. *C08G 63/84* (2013.01); *C08G 63/823* (2013.01); *C08G 63/08* (2013.01); *C08G 63/82* (2013.01); *C08L 101/16* (2013.01)

(58) Field of Classification Search
CPC ....... C08G 63/08; C08G 63/823; C08G 63/84
USPC ............ 562/589; 525/411; 528/280, 282, 357
See application file for complete search history.

(56) References Cited

U.S. PATENT DOCUMENTS

| 5,510,526 | A  | * | 4/1996  | Baniel et al. ................... 562/580 |
| 7,829,740 | B2 | * | 11/2010 | Enomoto et al. ............... 562/589 |
| 2002/0102672 | A1 | | 8/2002 | Mizrahi et al. |
| 2003/0004375 | A1 | | 1/2003 | Mizrahi et al. |
| 2006/0014975 | A1 | | 1/2006 | Coszach et al. |
| 2009/0088589 | A1 | | 4/2009 | Enomoto et al. |
| 2009/0227762 | A1 | * | 9/2009 | Blackburn et al. ............ 528/354 |
| 2010/0047140 | A1 | | 2/2010 | Enomoto et al. |

FOREIGN PATENT DOCUMENTS

| JP | 2003 64174  | 3/2003 |
| JP | 2003 511360 | 3/2003 |
| JP | 2003 518476 | 6/2003 |
| JP | 2006 501213 | 1/2006 |
| WO | 2007 001043 | 1/2007 |

OTHER PUBLICATIONS

Porter (Ring opening polymerization of lactide for the synthesis of poly (lactic acid), (University of Illinois, published on Mar. 6, 2006).*
International Search Report Issued Sep. 6, 2011 in PCT/JP11/63811 Filed Jun. 16, 2011.
Masaya Miyazaki, et al., "Enzymatic synthesis of pyruvic acid from acetaldehyde and carbon dioxide", Chemcomm Communication, 2001, pp. 1800-1801.

* cited by examiner

*Primary Examiner* — Gregory Listvoyb
(74) *Attorney, Agent, or Firm* — Oblon, McClelland, Maier & Neustadt, L.L.P.

(57) ABSTRACT

To provide a method capable of producing stereocomplex polylactic acid, the method being capable of using carbon neutral materials that are not competitive from foods, such as saccharides, without the use of a method for designing optical resolution, which requires complicated operations and high cost and is difficult to perform mass production. The production method of the present invention comprises: a step of reacting glycerin with sodium hydroxide in high-temperature and high-pressure water to produce a racemic sodium lactate aqueous solution; a step of separating sodium from the racemic sodium lactate aqueous solution to recover racemic lactic acid; a step of dimerizing the racemic lactic acid to produce a lactide mixture containing meso lactide and racemic lactide; a step of separating meso lactide from the mixture to recover racemic lactide; and a step of polymerizing the racemic lactide with a salen-metal complex as a catalyst to produce stereocomplex polylactic acid.

16 Claims, 8 Drawing Sheets

METHOD FOR PRODUCING POLYLACTIC ACID

This application is a National Stage of PCT/JP11/063811 filed Jun. 16, 2011 and claims the benefit of JP 2010-137992 filed Jun. 17, 2010.

TECHNICAL FIELD

The present invention relates to a method for producing polylactic acid from glycerin, in which the polylactic acid produced is stereocomplex polylactic acid, which is known as a resin having higher heat-resisting property due to formation of an eutectic crystal of poly-L-lactic acid and poly-D-lactic acid than poly-L-lactic acid or poly-D-lactic acid.

BACKGROUND ART

In recent years, bioplastics formed from natural plants as a raw material have been receiving attention in view of the global warming issue. Bioplastics are formed from plants that are originally present on earth, and thus the major advantage of bioplastics is the carbon neutral property thereof, i.e., they exerts no influence on increase and decrease of carbon dioxide on earth. Bioplastics are produced by using biomass-derived materials, i.e., substances that are formed by plants through fixation of carbon dioxide in the air, and therefore, disposal by combustion thereof provides even balance for carbon dioxide, which may be measures against global warming.

Polylactic acid is a polymer formed by polymerizing lactic acid through ester bond, and is one of bioplastics capable of being synthesized from plant-derived materials. On acting lactobacillus on glucose, sucrose or the like, lactic acid is obtained by the fermentative action thereof. The saccharides as raw materials may be mass-produced by acting an enzyme (such as amylase) on starch obtained from potatoes, corns or the like or by extracting from sugarcanes. The demand of polylactic acid has been increased in recent years from the standpoint of "carbon neutral".

However, corns and sugarcanes as raw materials of polylactic acid are also utilized as foods, and thus there may be an issue of competition from foods.

Lactic acid has one asymmetric carbon atom and includes two optical isomers, i.e., an L-isomer and a D-isomer. A polymer obtained by polymerizing only the L-isomer is referred to as poly-L-lactic acid, and a polymer obtained by polymerizing only the D-isomer is referred to as poly-D-lactic acid. It has been known that these polymers have helical structures that are inverse to each other due to their respective configuration, and it has been said that the melting point thereof is approximately 175° C.

On the other hand, it has also been known that a mixture of poly-L-lactic acid and poly-D-lactic acid is a resin having higher heat-resisting property due to formation of an eutectic crystal of poly-L-lactic acid and poly-D-lactic acid than poly-L-lactic acid or poly-D-lactic acid. The resin is referred to as stereocomplex polylactic acid (SC-PLA), and it has been said that the melting point thereof is approximately 225° C.

Direct polymerization of L-lactic acid and D-lactic acid from a mixture thereof forms a polymer that has L-lactic acid and D-lactic acid mixed randomly in one lactic acid polymer chain, i.e., so-called poly-DL-lactic acid. Poly-DL-lactic acid shows no crystallinity and is softened at a glass transition temperature around 50° C., and thus the polymer is not suitable for practical use.

For producing stereocomplex polylactic acid, it has been necessary that poly-L-lactic acid and poly-D-lactic acid are separately produced and then mixed, which is inefficient. A saccharide is converted mainly to L-lactic acid on acting Stc. *Thermophilus* or the like as an L-lactic acid producing strain among the lactobacillus strains. A saccharide is converted mainly to D-lactic acid on acting Leus. Mesenteroides or the like as a high purity D-lactic acid producing strain among the lactobacillus strains. Accordingly, for producing L-lactic acid and D-lactic acid separately, it is necessary to use separate strains and to perform fermentation separately, which are inefficient.

Other known production methods of lactic acid include a method of forming cyanohydrin from acetaldehyde in the presence of an enzyme, and then acid-hydrolyzing cyanohydrin (see Non-patent Document 1), and a method of forming cyanohydrin from acetaldehyde and hydrocyanic acid, and then esterifying cyanohydrin, for example, in the presence of hydrochloric acid. According to the methods, racemic lactic acid containing equal amounts of L-lactic acid and D-lactic acid mixed is produced.

On polymerizing racemic lactic acid directly, however, only poly-DL-lactic acid containing L-lactic acid and D-lactic acid mixed in one lactic acid polymer chain, but stereocomplex polylactic acid cannot be produced. In order to produce stereocomplex polylactic acid from racemic lactic acid, it is necessary to separate L-lactic acid and D-lactic acid by a method for designing optical resolution. As the method for designing optical resolution of racemic lactic acid, a crystallization method and a separation method by chromatography have been known, but these methods require complicated operations and high cost, and it is difficult to separate a large amount of compounds by the methods.

Furthermore, acetaldehyde is produced almost from petroleum materials, and therefore, polylactic acid formed by polymerizing lactic acid that is produced by the methods may not be considered as bioplastics.

Non-patent Literature 1: Chem. Commun., 2001, p. 1800

DISCLOSURE OF INVENTION

Technical Problem

The invention has been made in view of the aforementioned circumstances, and an object thereof is to provide a method capable of producing stereocomplex polylactic acid, the method being capable of using carbon neutral materials that are not competitive from foods, such as saccharides, without the use of a method for designing optical resolution, which requires complicated operations and high cost and is difficult to perform mass production.

Solution to Problem

Figure 1:
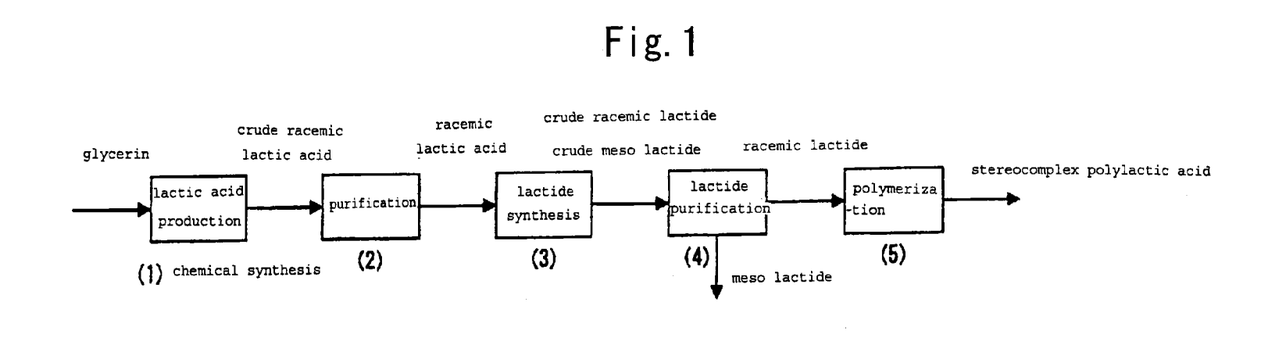
FIG. 1 is a diagram showing a process according to the present invention for producing stereocomplex polylactic acid from glycerin.

FIG. 1 shows a process of production of stereocomplex polylactic acid from glycerin according to the invention.

For solving the problems, the invention relates to a method for producing stereocomplex polylactic acid, comprising:

(1) a step of reacting glycerin with sodium hydroxide in high-temperature and high-pressure water to produce a racemic sodium lactate aqueous solution;

(2) a step of recovering racemic lactic acid from the racemic sodium lactate aqueous solution;

(3) a step of dimerizing the racemic lactic acid to produce a lactide mixture containing meso lactide and racemic lactide;

(4) a step of separating racemic lactide from meso lactide in the mixture; and (5) a step of polymerizing the racemic lactide with a salen-metal complex as a catalyst to produce stereocomplex polylactic acid.

It is preferred that the step (1) is performed in such a manner that glycerin and sodium hydroxide are dissolved in water to form an aqueous solution, and the aqueous solution is maintained under high-temperature and high-pressure condition of a temperature in a range of from 250 to 350° C. and a pressure in a range of from 5 to 15 MPa.

It is preferred that the step (2) is performed in such a manner that the racemic sodium lactate aqueous solution is made acidic and is made in contact with an organic solvent to extract racemic lactic acid to the organic solvent, and then the organic solvent is evaporated to recover racemic lactic acid.

It is preferred that in the step (2), the organic solvent is one selected from the group consisting of propanol, butanol, methyl acetate, triethylamine and methyl ethyl ketone.

It is preferred that the step (3) is performed in such a manner that an oligomer of lactic acid as a precursor is formed by dehydration condensation of racemic lactic acid, the oligomer is then depolymerized and cyclized to form a lactide mixture containing meso lactide and racemic lactide, and the lactide mixture is taken out of the reaction system.

It is preferred that in the step (3), the oligomer as a precursor is formed under condition of a temperature of from 100 to 200° C. and a pressure of from 10 to 80 kPa.

It is preferred that in the step (3), the lactide is formed under condition of a temperature of from 150 to 250° C. and a pressure of from 0.5 to 5 kPa.

It is preferred that the step (4) is performed by a melting and crystallization method that utilizes a difference in melting point between racemic lactide having a melting point of 118° C. and meso lactide having a melting point of approximately 60° C.

It is preferred that the step (5) is performed by using a salen-metal complex represented by the following general formula as a catalyst:

wherein R1 and R2 each represent hydrogen, an alkyl group having from 1 to 6 carbon atoms, an alkoxy group having from 1 to 6 carbon atoms, a halogen group, such as chlorine, bromine and fluorine, a silyl group, an aryl group having from 6 to 18 nuclear carbon atoms, or a methoxymethyl group; R3 represents a divalent aliphatic hydrocarbon group having from 2 to 6 carbon atoms; and M represents Al, Fe, Ti or Y.

The invention also relates to stereocomplex polylactic acid synthesized from glycerin, the stereocomplex polylactic acid being produced by the method described in any one of the aforementioned items.

Figure 2:
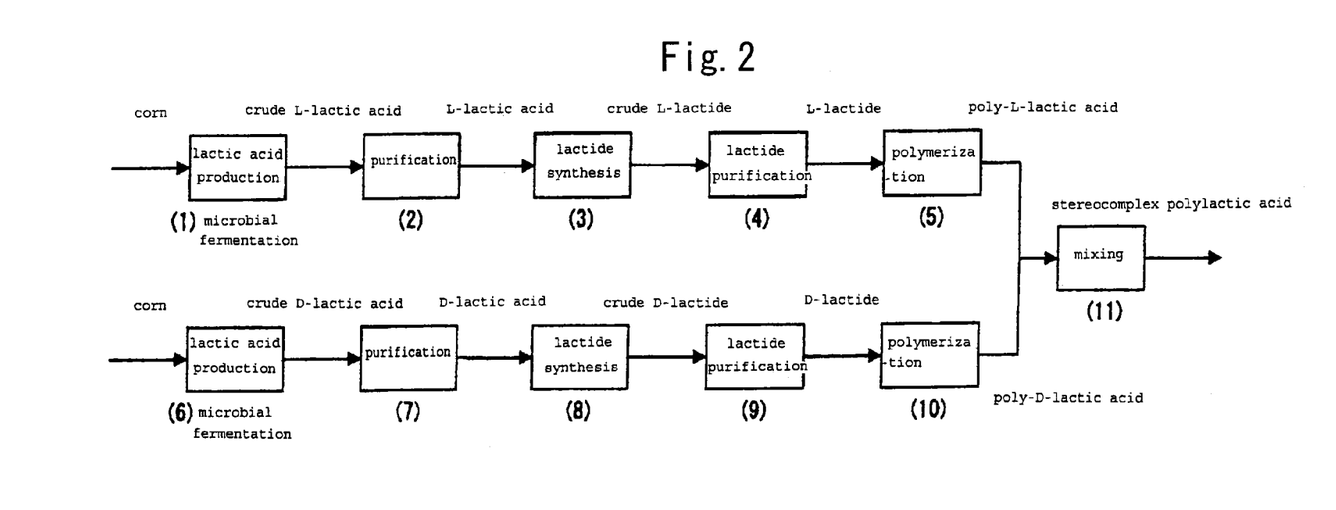
FIG. 2 is a diagram showing an ordinary process of production of stereocomplex polylactic acid from fermented lactic acid.

For comparison, FIG. 2 shows an ordinary process of production of stereocomplex polylactic acid from fermented lactic acid. According to the fermentation method, poly-L-lactic acid and poly-D-lactic acid are produced separately, and then they are mixed to produce stereocomplex polylactic acid. In the steps (1) and (6), L-lactic acid and D-lactic acid are produced by using different microorganisms, respectively. In the steps (2) and (7), lactic acid is purified by separating the saccharide, the culture medium, an alkali substance for controlling pH, water and the like used for the fermentation. In the steps (3) and (8), L-lactide and D-lactide are produced. In the steps (4) and (9), impurities in lactide, such as lactic acid, a linear dimer and water, are removed. In the steps (5) and (10), poly-L-lactic acid and poly-D-lactic acid are produced from lactide. In the step (11), poly-L-lactic acid and poly-D-lactic acid are mixed to produce stereocomplex polylactic acid. It is understood that the ordinary method shown in FIG. 2 requires more steps than the method according to the present invention shown in FIG. 1.

Figure 3:
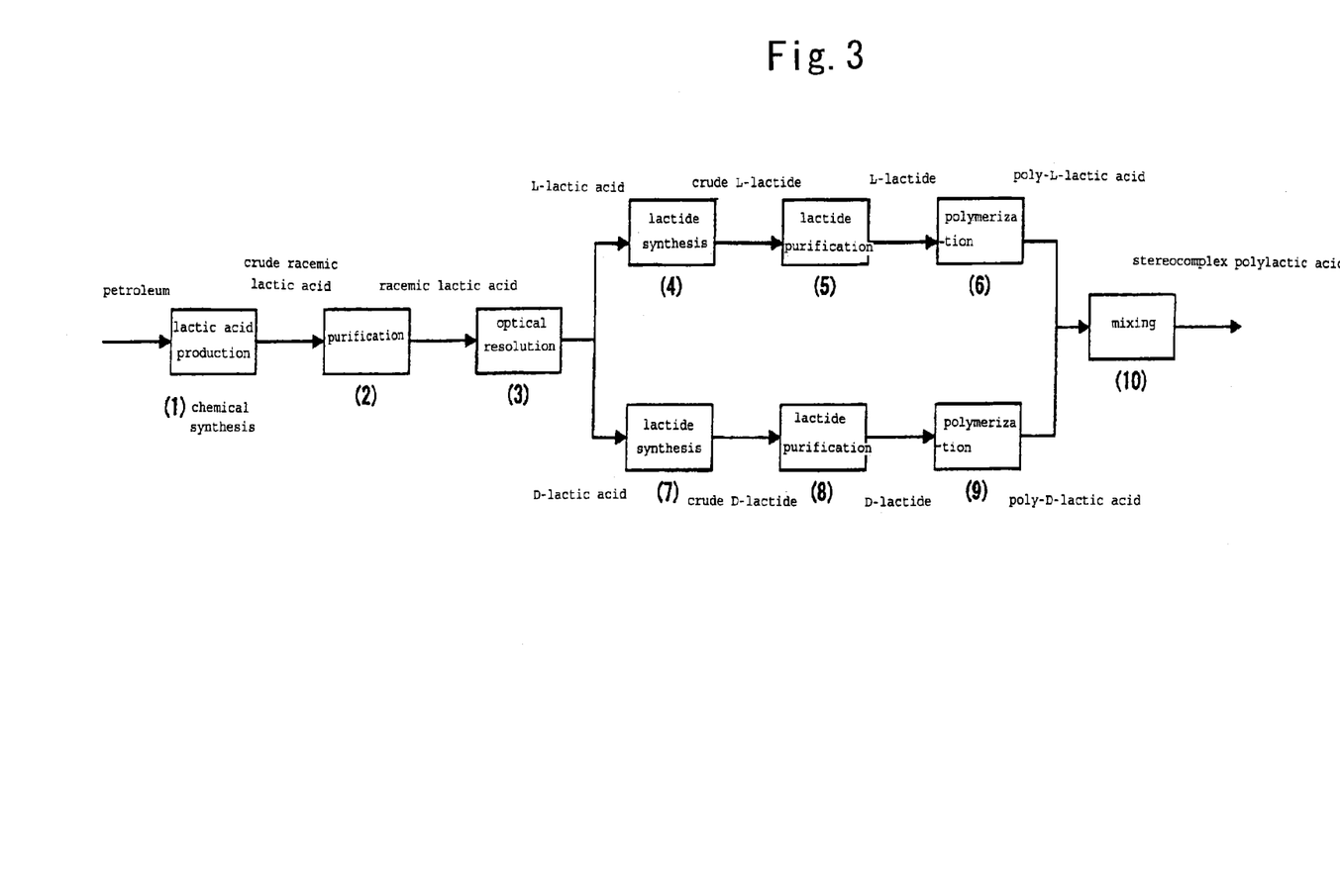
FIG. 3 is a diagram showing an ordinary process of production of stereocomplex polylactic acid from petroleum-derived lactic acid.

FIG. 3 shows a process of production of stereocomplex polylactic acid from petroleum-derived lactic acid. In this method, the same amounts of L-lactic acid and D-lactic acid are produced simultaneously, but it is necessary, in the course of process, to separate L-lactic acid and D-lactic acid by a method for designing optical resolution. In the step (1), lactic acid is produced from petroleum as a raw material. Lactic acid thus produced in this step is racemic lactic acid containing L-lactic acid and D-lactic acid mixed in equivalent amounts. In the step (2), impurities (such as unreacted raw materials) in the racemic lactic acid are removed. In the step (3), racemic lactic acid is separated to L-lactic acid and D-lactic acid. As the method for designing optical resolution of racemic lactic acid, a crystallization method and a separation method by chromatography have been known. In the steps (4) and (7), L-lactide and D-lactide are produced separately. In the steps (5) and (8), impurities in lactide, such as lactic acid, a linear dimer and water, are removed. In the steps (6) and (9), poly-L-lactic acid and poly-D-lactic acid are produced from lactide separately. In the step (10), poly-L-lactic acid and poly-D-lactic acid are mixed to produce stereocomplex polylactic acid. It is understood that the ordinary method shown in FIG. 3 requires more steps than the method according to the present invention shown in FIG. 1.

Advantageous Effects of Invention

Various advantageous effects may be obtained by performing the steps (1) to (5) defined in claim 1 of the present invention.

(1) The raw material of polylactic acid has been ordinarily corns, tubers and roots, which are foods, but the raw material of polylactic acid produced in the present invention is glycerin, which is an industrial by-product, and thus competition from foods may be avoided. The use of glycerin, which is a by-product in the fat and oil industry, as a raw material for producing lactic acid may supply lactic acid to the plastic industry in a large amount and low cost, whereby the use of lactic acid may be promoted, and consequently it is expected to contribute to establishment of a recycling society.

(2) The production of stereocomplex polylactic acid according to the invention does not comprise a step of separating L-lactic acid and D-lactic acid or L-lactide and D-lactide by a so-called method for designing optical resolution. The optical resolution operation requires complicated operations and high cost, and thus is industrially employed mainly in expensive foods (such as an amino acid) and pharmaceuticals. Accordingly, production of stereocomplex polylactic acid without optical resolution operation provides significant industrial advantages. Thus, the present invention may industrially supply stereocomplex polylactic acid excellent in thermal stability, which has not be able to be supplied in a large amount at low cost by the ordinary methods.

(3) Polylactic acid produced in the present invention is bioplastics derived from animal- or plant-derived fat and oil, and thus is expected to contribute to the measures against global warming from the standpoint of carbon neutral.

BRIEF DESCRIPTION OF DRAWINGS

FIG. 10 is a diagram showing a $^1$H-NMR spectrum in the methine group region of polylactic acid obtained in Example 5a.

DESCRIPTION OF EMBODIMENTS

The method for producing stereocomplex polylactic acid of the present invention will be described in detail below.

Figure 4:
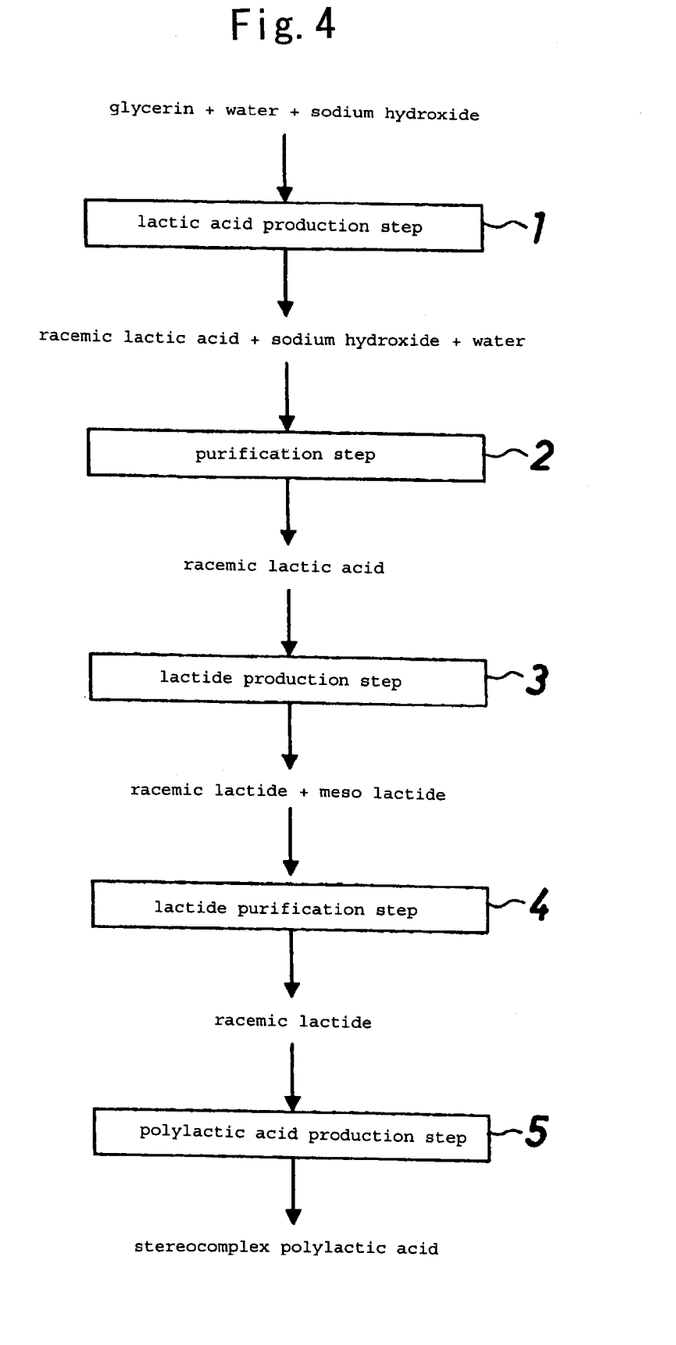
FIG. 4 is a flow chart showing a method for producing stereocomplex polylactic acid according to the present invention.

FIG. 4 is a flow chart showing the method for producing stereocomplex polylactic acid of the present invention.

In the production method of the present invention, glycerin is used as a raw material.

Glycerin is industrially produced as a by-product of soap, a higher fatty acid or a biodiesel fuel. Soap, a higher fatty acid and a biodiesel fuel are produced from animal- or plant-derived fat and oil as a raw material, and since fat and oil are constituted by glycerin and a fatty acid, glycerin is necessarily produced as a by-product in the production process of fat and oil. Soap, a higher fatty acid and a biodiesel fuel are essential products in the daily life, and their production volumes are being increased year by year. The production volume of glycerin, which is their by-product, is also being increased, and a method of effective utilization of glycerin is demanded in recent years. The present invention may meet the social demand.

(Lactic Acid Production Step)

The lactic acid production step (1) is a step of converting glycerin to lactic acid through action of alkali and high-temperature and high-pressure water.

Glycerin as a raw material and an alkali substance, such as sodium hydroxide, may be mixed with water to produce an aqueous solution, which may be maintained under high-temperature and high-pressure condition of a temperature in a range of from 250 to 350° C., for example, 300° C., and a pressure in a range of from 5 to 15 MPa, for example, 10 MPa, for a period of from 10 to 200 minutes, for example, 60 minutes, thereby converting glycerin to lactic acid at a yield of 70% or more.

The stoichiometric equation of the reaction may be expressed by the formula (1) below.

Hydrogen gas is formed as a by-product as understood from the formula (1). Lactic acid thus produced herein is racemic lactic acid.

(Lactic Acid Purification Step)

The lactic acid purification step (2) is a step of separating sodium and water from the sodium lactate aqueous solution obtained in the step (1), thereby collecting pure lactic acid.

Purification of lactic acid may be performed by utilizing some methods, such as (i) an extraction method, (ii) an esterification method and (iii) an electrodialysis method, and a solvent extraction method is described in detail herein.

In the solvent extraction method, for example, an alcohol solvent, such as propanol and butanol, an ester solvent, such as methyl acetate, an amine solvent, such as triethylamine, and a ketone solvent, such as methyl ethyl ketone, may be used. For extracting lactic acid from the sodium lactate aqueous solution with an organic solvent, it is necessary to make the sodium lactate aqueous solution acidic. In the sodium lactate aqueous solution, the most amount of lactic acid is present in the form of lactate ion ($CH_3$—CH(OH)—COO$^-$), and by decreasing pH of the aqueous solution to 2.0 or less, lactic acid is present in the form of lactic acid ($CH_3$—CH(OH)—COOH). The operation facilitates extraction of lactic acid with an organic solvent.

The sodium lactate aqueous solution having been made acidic with an acid, such as sulfuric acid, is made in contact with the organic solvent, and thereby the most part of lactic acid is transferred to the organic solvent. In this case, the most part of sodium ion remains in water in the form of a counter cation forming a salt with sulfate ion. The solvent phase, to which lactic acid has been extracted, is separated from the aqueous phase, and the solvent is then evaporated therefrom by an evaporation method, thereby providing lactic acid thus separated from sodium.

(Lactide Production Step)

The lactide production step (3) is a step of synthesizing lactide from racemic lactic acid. The lactide obtained in this step is a mixture of racemic lactide and meso lactide. Lactide means a cyclic compound that is formed with two molecules of lactic acid through dehydration condensation of the hydroxyl group and the carboxyl group of the two molecules, respectively. L-lactide means a cyclic compound that is formed with two molecules of L-lactic acid through dehydration condensation. D-lactide means a cyclic compound that is formed with two molecules of D-lactic acid through dehydration condensation.

Meso lactide means a cyclic compound that is formed with one molecule of L-lactic acid and one molecule of D-lactic acid through dehydration condensation.

Racemic lactide means a mixture of equal amounts of L-lactide and D-lactide, i.e., lactide that has an optical purity of 0%.

Various reports have been made for the method of synthesizing lactide, which is a cyclic dimer of lactic acid, from lactic acid, and such a method is ordinarily employed that a prepolymer, which is referred to as an oligomer, is synthesized, and then lactide is synthesized by cyclization thereof through intramolecular ester exchange reaction. This method is reported by Kulkarni (R. K. Kulkarni, Arch. Surg., 93, 839 (1966)). The oligomer in the present invention means a lactic acid polymer formed of from 2 to 30 lactic acid molecules.

Synthesis of lactide from racemic lactic acid forms three isomers, i.e., L-lactide, D-lactide and meso lactide. The formation ratio of the isomers is probabilistically 25/25/50, but varies to some extent depending on the condition for the synthesis of lactide. However, the weight ratio of L-lactide and D-lactide is necessarily 1/1.

Lactic acid undergoes dehydration condensation by heating to 200° C. under reduced pressure of 100 kPa or less, thereby forming an oligomer of from a decamer to eicosamer. The stoichiometric equation of the condensation of lactic acid may be expressed by the formula (2) below.

(2)

The oligomer and lactide are in an equilibrium state expressed by the formula (3) below.

(3)

Lactide has a vapor pressure that is higher than the vapor pressure of the oligomer, and therefore resulting lactide may be taken out of the reaction system through vaporization by heating under reduced pressure (210° C., 2 kPa). Taking out lactide to the outside of the reaction system directs the equilibrium toward the formation of lactide. The repetition of the operation converts the most amount of the oligomer to lactide.

(Lactide Purification Step)

The lactide purification step (4) is a step of removing meso lactide from the mixture of racemic lactide and meso lactide.

L-lactide and D-lactide have the same physical properties other than the steric structure, but racemic lactide, which is a mixture of L-lactide and D-lactide, and meso lactide are slightly different from each other in the physical properties (such as the boiling point, the melting point and the solubility in a solvent). Racemic lactide and meso lactide may be separated from each other by utilizing the difference of the physical properties. Examples of the method therefor include a crystallization method from a solvent, a melting and crystallization method, and an evaporation method.

Racemic lactide has a melting point of approximately 118° C. whereas meso lactide has a melting point of approximately 60° C., and thus they may be separated from each other by the melting and crystallization method utilizing the difference of the melting points.

On heating a mixture of racemic lactide and meso lactide to 65° C., which is between 60° C. and 118° C., i.e., the melting points thereof, the mixture is separated into a liquid phase and a solid phase. The liquid phase contains racemic lactide and meso lactide in a liquid state, in which the content of meso lactide is larger.

The solid phase also contains racemic lactide and meso lactide in a solid state, in which the content of racemic lactide is larger.

Only the solid phase is taken out and is heated to 75° C., which is between 65° C. and 118° C., and thus the mixture is again separated into a liquid phase and a solid phase. The content of racemic lactide in the solid phase becomes larger than in the previous operation. The repetition of the similar operations may provide racemic lactide having high purity.

(Polylactic Acid Production Step)

The polylactic acid production step (5) is a step of polymerizing racemic lactide to produce stereocomplex polylactic acid.

Racemic lactide may undergo stereoselective ring-opening polymerization by using, as a catalyst, an aluminum complex having a salen ligand having a particular substituent.

Figure 5:
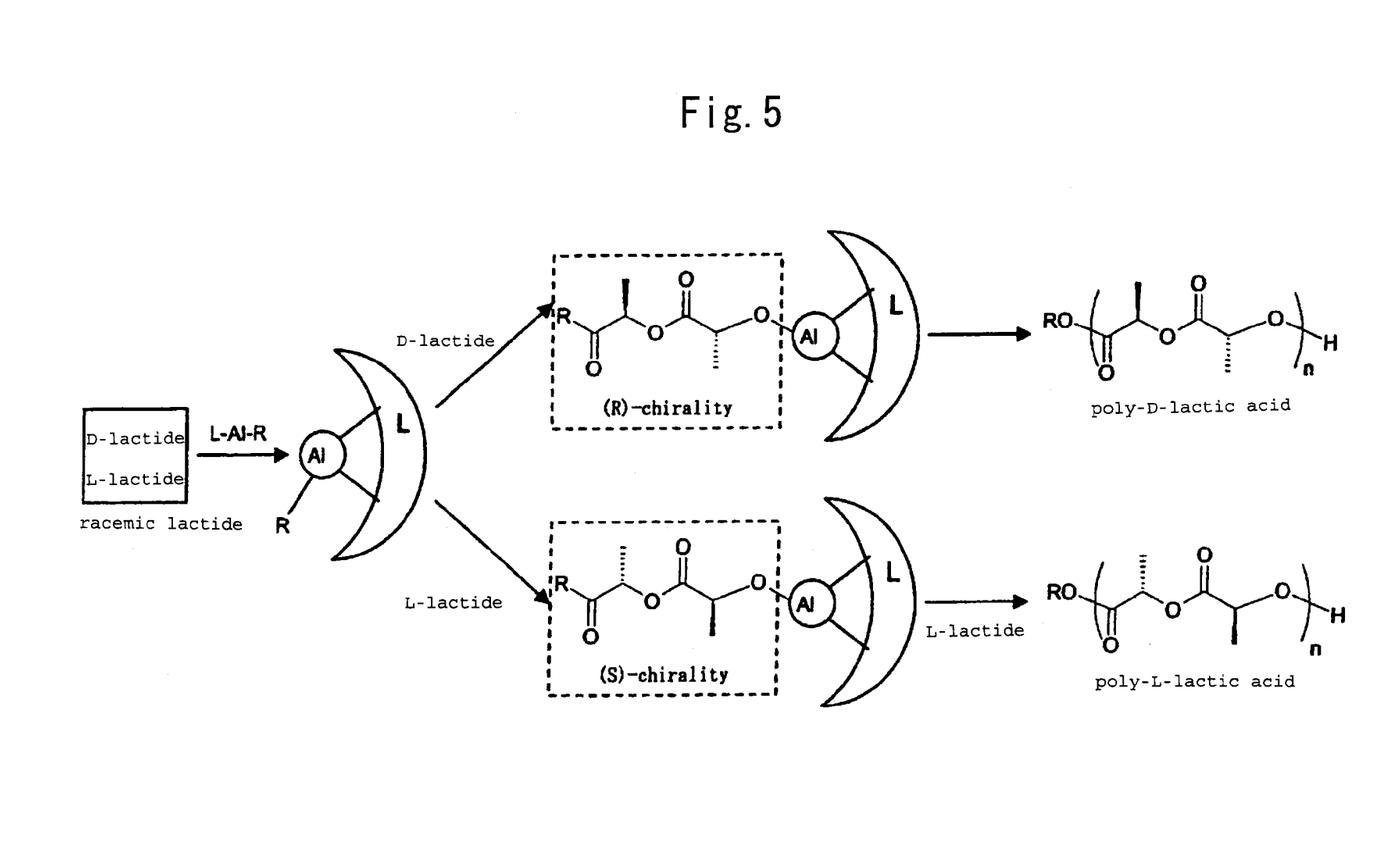
FIG. 5 is a diagram showing the polymerization principle of stereocomplex polylactic acid.

FIG. 5 shows the principle of the reaction. In the initiation of the reaction, the aluminum complex as a catalyst is reacted with D-lactide or L-lactide to form a composite having molecular asymmetry derived from the lactide respectively. In the subsequent propagation reaction, the monomers are reacted in sequence to propagate the polymer, and the monomer is reacted while being selected sterically with the molecular asymmetry derived from the monomer at the polymer propagation end. That is, in the case where the polymer propagation end is derived from D-lactide, for example, the same molecule, i.e., D-lactide, is selected sterically as the monomer subsequently reacted, and thus reacted. Accordingly, in the case where the aluminum complex and D-lactide are reacted in the initiation of the reaction, D-lactide contained in lactide is reacted in sequence in the propagation reaction, thereby forming poly-D-lactic acid. Similarly, in the case where the aluminum complex and L-lactide are reacted in the initiation of the reaction, L-lactide contained in racemic lactide is reacted in sequence in the propagation reaction, thereby forming poly-L-lactic acid. In this manner, poly-D-lactic acid and poly-L-lactic acid are synthesized simultaneously from racemic lactide as a raw material, and thus stereocomplex polylactic acid is synthesized.

The present invention will be described more specifically with reference to examples of the present invention and comparative examples for comparison thereto.

EXAMPLE 1

Lactic Acid Production Step (Operation Procedures)

Figure 6:
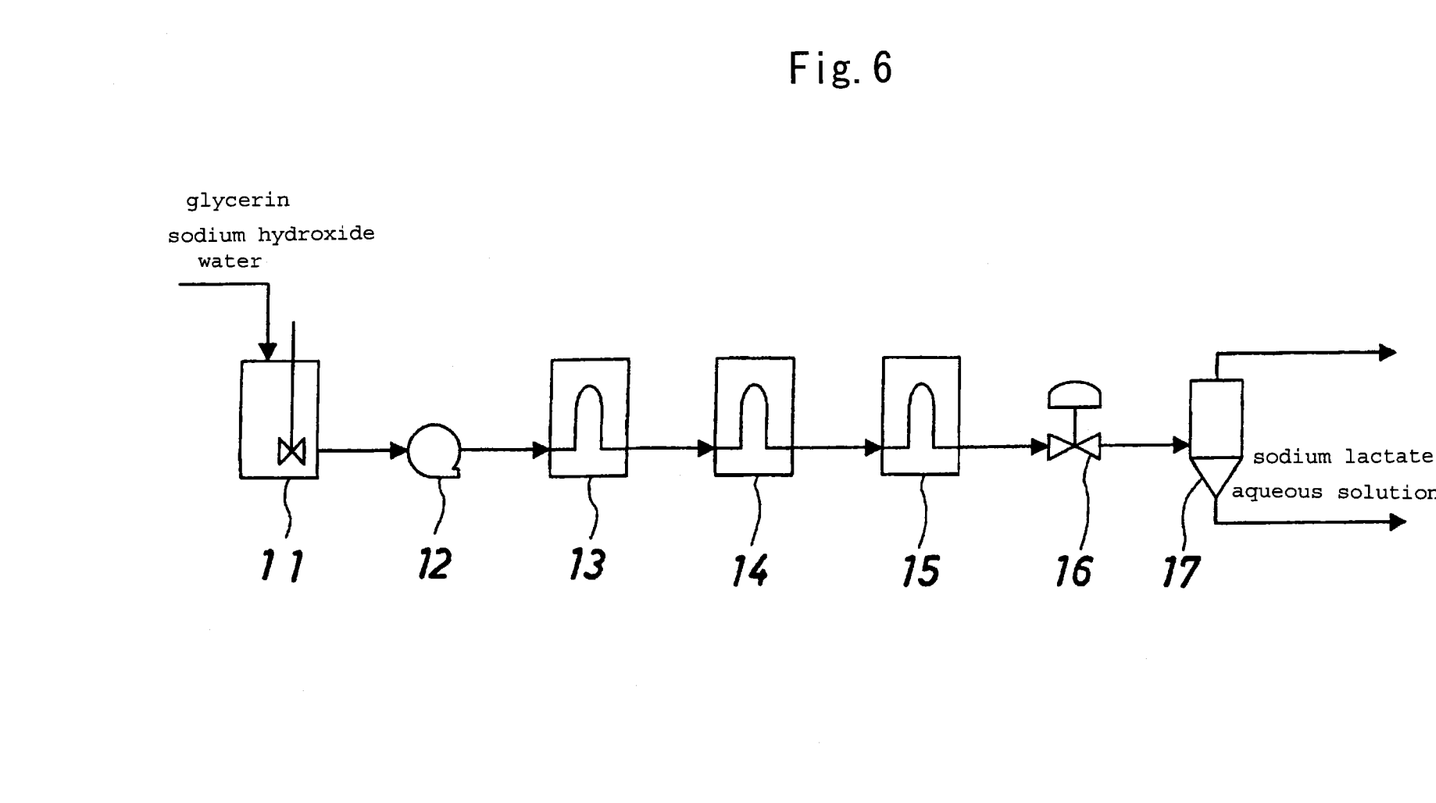
FIG. 6 is a flow diagram showing a lactic acid production equipment used in a lactic acid production process.

FIG. 6 shows a flow diagram of a lactic acid production equipment relating to the present invention.

In a raw material storage tank (11), glycerin, sodium hydroxide and water are mixed to prepare a glycerin aqueous solution having a prescribed concentration. The amount of sodium hydroxide is preferably an equimolar or larger amount to glycerin.

A metering pump (12) pressurizes the glycerin aqueous solution to a prescribed pressure and feeds the solution to a reactor at a prescribed flow rate. The flow rate is 20 L/h. The pressure may be controlled depending on the reaction temperature and is approximately from 6 to 20 MPa.

In a preheater (13), the glycerin aqueous solution is heated to a prescribed temperature. The reaction temperature is from 250 to 300° C. When the reaction temperature is low, the reaction rate is lowered, and when the reaction temperature is high, lactic acid thus formed may be decomposed. Accordingly, the reaction temperature is desirably approximately from 280 to 320° C. In this example, the solution is heated with an electric heater, and a heat medium, steam and other heat sources may be used.

In a reactor (14), glycerin is reacted to convert to lactic acid and hydrogen gas. Accordingly, the fluid at the outlet of the reactor (14) is a two-phase fluid of a sodium lactate aqueous solution and hydrogen gas. The capacity of the reactor (14) is 20 L, and the residence time is 1 hour. The residence time may be changed from 10 to 200 minutes by controlling the flow rate of the metering pump.

In a cooler (15), the temperature of the two-phase fluid of a sodium lactate aqueous solution and hydrogen gas is lowered to 100° C. or less. In this example, the two-phase fluid is cooled with water, but it may be cooled through heat exchange with the preheater.

In a pressure-regulating valve (16), the pressure of the two-phase fluid of a sodium lactate aqueous solution and hydrogen gas is lowered to the atmospheric pressure.

In a gas-liquid separator (17), the two-phase fluid of a sodium lactate aqueous solution and hydrogen gas is separated into hydrogen gas and a sodium lactate aqueous solution. In this example, the two-phase fluid is separated with a cyclone separator.

Example 1c employed the same condition as in Example 1a except that the temperature was raised to 320° C. As compared to Example 1a, the lactic acid concentration was lowered to 180 g/L. It is considered that this is because increasing the temperature decomposes lactic acid thus formed.

Example 1d employed the same condition as in Example 1a except that the sodium hydroxide concentration was lowered to 50 g/L. As compared to Example 1a, the lactic acid concentration was lowered to 80 g/L. It is considered that this is because decreasing the sodium hydroxide concentration prevents glycerin from being reacted. As shown in the following formula (1), it is considered that sodium hydroxide is necessarily added in an equimolar or larger amount to glycerin.

Example 1e employed the same condition as in Example 1a except that the sodium hydroxide concentration was raised to 150 g/L. As compared to Example 1a, the lactic acid concentration was lowered to 175 g/L. It is considered that this is because increasing the sodium hydroxide concentration facilitates decomposition of lactic acid thus formed.

TABLE 1

| | Operation condition | | | | | Results | | | | |
| | Concentration condition | | Reaction condition | | | Liquid phase | | Gas phase | Gas composition | | |
| | Glycerin g/L | Sodium hydroxide g/L | Temperature °C. | Pressure MPa | Time hr | Lactic acid concentration g/L | Unreacted lactic acid concentration g/L | Gas generation amount mL/g | Hydrogen vol % | Methane vol % | Ethylene vol % |
| --- | --- | --- | --- | --- | --- | --- | --- | --- | --- | --- | --- |
| Example 1a | 300 | 130 | 300 | 10 | 1 | 220 | 50  | 210 | 97.0 | 2.0 | 1.0 |
| Example 1b | 300 | 130 | 280 | 10 | 1 | 150 | 120 | 110 | 98.0 | 1.5 | 0.5 |
| Example 1c | 300 | 130 | 320 | 10 | 1 | 180 | 10  | 220 | 95.0 | 4.0 | 1.0 |
| Example 1d | 300 | 50  | 300 | 10 | 1 | 80  | 200 | 50  | 98.0 | 1.5 | 0.5 |
| Example 1e | 300 | 150 | 300 | 10 | 1 | 175 | 5   | 210 | 94.0 | 4.5 | 1.5 |

Gas generation amount: gas generation amount per 1 g of glycerin (Results)

The results of lactic acid production are summarized in Table 1.

In Example 1a, an aqueous solution having a glycerin concentration of 300 g/L and a sodium hydroxide concentration of 130 g/L was used, and lactic acid was produced under condition of a temperature of 300° C., a pressure of 10 MPa and a time of 1 hour. The reaction solution had a lactic acid concentration of 220 g/L and an unreacted glycerin concentration of 50 g/L, and the gas generation amount was 210 mL/g-glycerin per 1 g of glycerin. 97 vol % of the gas composition was hydrogen. The measurement of optical purity of the lactic acid aqueous solution with a polarimeter revealed that the optical purity was 0%, from which it was found that lactic acid thus obtained was a racemic substance.

Example 1b employed the same condition as in Example 1a except that the temperature was lowered to 280° C. As compared to Example 1a, the lactic acid concentration was lowered to 150 g/L. It is considered that this is because decreasing the temperature lowers the reaction rate of the glycerin.

EXAMPLE 2

Lactic Acid Purification Step (Operation Procedures)

The lactic acid purification step (2) is a step of separating sodium and water from the sodium lactate aqueous solution obtained in the step (1), thereby collecting only lactic acid. The condition on purification of lactic acid is shown in Table 2. The operation procedures are shown below.

(1) The sodium lactate aqueous solution obtained in Example 1a is adjusted to have pH 1.0 with sulfuric acid.

(2) 100 g of the sodium lactate aqueous solution thus prepared in the item (1) and 800 g of an organic solvent are placed in a separating funnel having a capacity of 3 L and are well mixed.

(3) The mixture is allowed to stand in a thermostat chamber at approximately 40° C. until the aqueous phase and an organic phase are separated.

(4) The aqueous phase and the organic phase are separated from each other. The organic phase contains the most amount of lactic acid and a slight amount of water, but contains substantially no sodium sulfate. The aqueous phase contains the most amount of sodium sulfate and also contains slight amounts of lactic acid and the organic solvent.

(5) The organic solvent and water are recovered from the organic phase by evaporating with an evaporator. The organic phase recovered in the item (4) is maintained under condition of 40° C. and 7 kPa for 5 hours, and thereby only water and the organic solvent are evaporated, thereby recovering only lactic acid.

amount of sodium sulfate contained in lactic acid was also larger. Furthermore, a large amount of water was dissolved in the organic phase and thus required energy for evaporation thereof, and thus this example is disadvantageous as compared to Example 2a.

In Example 2c, butanol was used as the extraction solvent. The total weight of the organic phase after the extraction was 930 g, and the weight of lactic acid contained therein was 60 g. The amount of sodium sulfate contained in the organic phase was 3.0 g, and thus the most amount of the sodium content was removed. After distilling the organic phase with an evaporator, the total weight of the residual solution after the distillation was 60 g, and the weight of lactic acid contained therein was 55 g.

TABLE 2

| | Raw material composition | | | | Extraction condition | | | | | | |
|---|---|---|---|---|---|---|---|---|---|---|---|
| | Lactic | | | Others | | Mixed amount | | Standing condition | | Evaporation condition | | |
| | acid concentration wt % | Sodium sulfate wt % | Water wt % | (e.g., glycerin) wt % | Solvent | Raw material g | Solvent g | Temperature ° C. | Time hr | Temperature ° C. | Pressure kPa | Time hr |
| Example 2a | 20 | 21 | 54.5 | 4.5 | methyl acetate | 1,000 | 800 | 40 | 2 | 40 | 7 | 5 |
| Example 2b | 20 | 21 | 54.5 | 4.5 | propanol | 1,000 | 800 | 40 | 2 | 40 | 7 | 5 |
| Example 2c | 20 | 21 | 54.5 | 4.5 | butanol | 1,000 | 800 | 40 | 2 | 60 | 7 | 5 |
| Example 2d | 20 | 21 | 54.5 | 4.5 | triethylamine | 1,000 | 800 | 40 | 2 | 70 | 7 | 5 |
| Example 2e | 20 | 21 | 54.5 | 4.5 | methyl ethyl ketone | 1,000 | 800 | 40 | 2 | 40 | 7 | 5 |

(Results)

The results of purification of lactic acid are summarized in Table 3.

In Example 2a, methyl acetate was used as the extraction solvent. The total weight of the organic phase after the extraction was 810 g, and the weight of lactic acid contained therein was 66 g. The amount of sodium sulfate contained in the organic phase was 0.6 g, and thus the most amount of the sodium content was removed. The organic phase contains water, glycerin and other impurities, in addition to lactic acid. After distilling the organic phase with an evaporator, the total weight of the residual solution after the distillation was 70 g, and the weight of lactic acid contained therein was 63 g. The solvent and water were evaporated from the organic phase by distillation, thereby separating and collecting lactic acid. According to the operation, lactic acid was recovered from the sodium lactate aqueous solution.

In Example 2b, propanol was used as the extraction solvent. The total weight of the organic phase after the extraction was 1,320 g, and the weight of lactic acid contained therein was 132 g. The amount of sodium sulfate contained in the organic phase was 7.3 g, and thus the most amount of the sodium content was removed. After distilling the organic phase with an evaporator, the total weight of the residual solution after the distillation was 140 g, and the weight of lactic acid contained therein was 128 g. The amount of lactic acid thus recovered was larger than Example 2a, but the In Example 2d, triethylamine was used as the extraction solvent. The total weight of the organic phase after the extraction was 630 g, and the weight of lactic acid contained therein was 104 g. The amount of sodium sulfate contained in the organic phase was 0.07 g, and thus the most amount of the sodium content was removed. After distilling the organic phase with an evaporator, the total weight of the residual solution after the distillation was 70 g, and the weight of lactic acid contained therein was 50 g. The amount of sodium sulfate contained in lactic acid was smaller than Example 2a, but the loss of lactic acid in the evaporation of the solvent was large.

In Example 2e, methyl ethyl ketone was used as the extraction solvent. The total weight of the organic phase after the extraction was 950 g, and the weight of lactic acid contained therein was 80 g. The amount of sodium sulfate contained in the organic phase was 1.6 g, and thus the most amount of the sodium content was removed. After distilling the organic phase with an evaporator, the total weight of the residual solution after the distillation was 85 g, and the weight of lactic acid contained therein was 78 g. The yield of lactic acid was larger than Example 2a, but the amount of sodium sulfate contained in lactic acid was larger.

TABLE 3

| | | Properties of organic phase after extraction | | | | Properties of residual solution after distillation | | |
|---|---|---|---|---|---|---|---|---|
| | | | Contents of substances contained in organic phase | | | | Contents of substances contained in residual solution | |
| | | Total weight g | Lactic acid g | Sodium sulfate g | Water g | Total weight g | Lactic acid g | Sodium sulfate g |
| Example 2a | methyl acetate | 810 | 66.0 | 0.6 | 57 | 70 | 63 | 0.6 |
| Example 2b | propanol | 1,320 | 132.0 | 7.3 | 450 | 140 | 128 | 7.3 |
| Example 2c | butanol | 930 | 60.0 | 3.0 | 135 | 63 | 55 | 3.0 |
| Example 2d | triethylamine | 630 | 104.0 | 0.04 | 7 | 70 | 50 | 0.04 |
| Example 2e | methyl ethyl ketone | 950 | 80.0 | 1.6 | 170 | 85 | 78 | 1.6 |

Example 3

Lactide Synthesis Step (Equipment)

Figure 7:
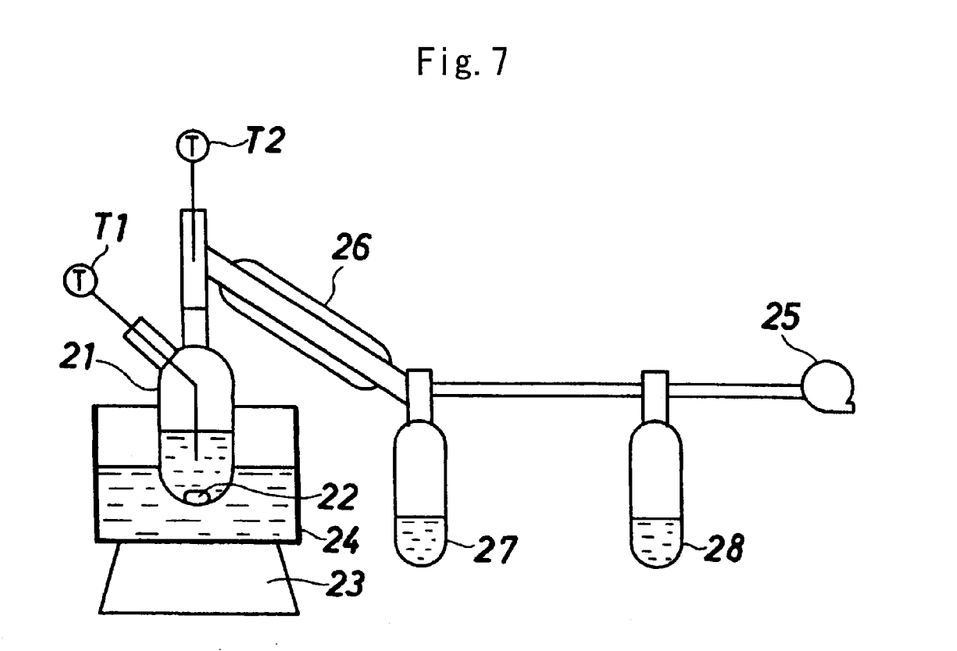
FIG. 7 is a diagram showing a lactide production equipment used in a lactide production process.

FIG. 7 shows a lactide production equipment used in this step.

A flask (21) is an eggplant flask having a capacity of 200 mL, to which lactic acid as a raw material and tin octylate as a catalyst are fed. The flask (21) is equipped with a thermometer Ti, with which the temperature of the sample under heating may be measured. A stirring bar (22) is placed in the flask (21), and the sample under heating may be well stirred with a stirrer (23). The flask (21) is heated and controlled for the temperature thereof with an oil bath (24). The flask (21) is connected to a vacuum pump (25), and may be depressurized to a prescribed pressure therewith.

By heating lactic acid under reduced pressure, water that is produced by the dehydration-condensation of lactic acid is evaporated. Lactic acid itself is converted to an oligomer. By further heating the oligomer thus produced under reduced pressure, lactide is formed from the oligomer, and lactide is evaporated.

A thermometer T2 measures the outlet temperature of the flask (21).

A condenser (26) is a water-cooled or air-cooled glass tube, with which water vapor or lactide vapor thus evaporated is condensed to a liquid state.

A reservoir (27) is a glass vessel with a scale, with which the amount of condensed water or lactide thus formed is measured.

A vacuum trap (28) recovers water vapor or lactic acid vapor that is not recovered by the reservoir. It is cooled to −79° C. with dry ice.

(Operation Procedures)

—Synthesis of Oligomer (1) 150 g of lactic acid obtained in Example 2a and 0.75 g of tin octylate as a catalyst are placed in a 200-mL eggplant flask (21).

(2) An oil bath (24) is set at 130° C., and the flask (21) is depressurized to 80 kPa with a vacuum pump (25).

(3) When evaporation of water is started with condensation of lactic acid, the temperature of the oil bath (24) is gradually raised, and the pressure is gradually lowered to 10 kPa with the vacuum pump (25).

(4) Water thus evaporated is cooled and condensed with a condenser (26) and recovered to a reservoir (27).

(5) After the lapse of approximately 4 hours, at which the dehydration amount reaches 27 g, the oligomer synthesis reaction is completed.

—Synthesis of Lactide (1) An oil bath (24) is set at 210° C., and the flask (21) is depressurized to 2 kPa with a vacuum pump (25).

(2) Lactide is formed from the oligomer, and evaporation of lactide is started.

(3) Lactide thus evaporated is cooled and condensed with a condenser (26) and recovered to a reservoir (27).

(4) After the lapse of 1.5 hours, at which 70 g of the oligomer is recovered, the lactide synthesis reaction is completed.

(Results)

The condition on synthesis of lactide is shown in Table 4, and the results of the lactide synthesis step are summarized in Table 5.

TABLE 4

| | Raw material | | Oligomer synthesis condition | | | Lactide synthesis condition | | |
|---|---|---|---|---|---|---|---|---|
| | Lactic acid | Catalyst | Temperature | Pressure | Time | Temperature | Pressure | Time |
| | g | g | °C. | kPa | hr | °C. | kPa | hr |
| Example 3a | produced in Example 2a 150 | tin octylate 0.75 | 130-200 | 80-10 | 4 | 210 | 2 | 1.5 |
| Example 3b | produced in Example 2a 150 | tin octylate 0.75 | 200 | 80 | 6 | 210 | 2 | 1.5 |
| Example 3c | produced in Example 2a 150 | tin octylate 0.75 | 130-200 | 80-10 | 4 | 210 | 10 | 1.5 |

TABLE 5

| | Synthesis results of oligomer | Synthesis results of lactide | | | | |
|---|---|---|---|---|---|---|
| | Number average molecular weight of oligomer Mw | Amount of water g | Total amount of recovered lactide g | Racemic lactide g | Meso lactide g | Others (e.g., water, lactic acid and linear lactic acid dimer) g |
| Example 3a | 1,600 | 27 | 76 | 34 | 27 | 15 |
| Example 3b | 1,000 | 23 | 60 | 21 | 18 | 21 |
| Example 3c | 1,800 | 28 | 45 | 11 | 13 | 21 |

In Example 3a, 150 g of lactic acid produced in Example 2a was used as a raw material. 0.75 g of tin octylate was used as a catalyst. The oligomer synthesis condition was a temperature of from 130 to 200° C., a pressure of from 80 to 10 kPa and a duration time of 4 hours. The lactide synthesis condition is a temperature of 210° C., a pressure of 2 kPa and a reaction time of 1.5 hours. In the oligomer synthesis step, the amount of recovered water was 27 g. The number average molecular weight of the resulting oligomer measured with a gel permeation chromatography (GPC) analyzer was 1,600. The total amount of lactide recovered by the lactide synthesis experiment was 76 g. As a result of analysis of the composition of lactide by nuclear magnetic resonance analysis ($^1$H-NMR), it was found that lactide contained 34 g of racemic lactide and 27 g of meso lactide. Lactide thus recovered contained water, lactic acid, a linear lactic acid dimer and the like as other impurities.

In Example 3b, the oligomer synthesis condition was a constant temperature of 200° C., a constant pressure of 80 kPa and a reaction time of 6 hours. The other condition is the same as in Example 3a. The number average molecular weight of the resulting oligomer measured with a gel permeation chromatography (GPC) analyzer was 1,000, which was smaller than the oligomer obtained in Example 3a. The total amount of lactide recovered by the lactide synthesis experiment was 60 g, which was smaller than lactide obtained in Example 3a. As a result of analysis of the composition of recovered lactide by nuclear magnetic resonance analysis ($^1$H-NMR), lactide contained 21 g of impurities including water, lactic acid, a linear lactic acid dimer and the like, and the impurity amount was larger than lactide obtained in Example 3a.

In Example 3c, the lactide synthesis condition was a pressure of 10 kPa. The other condition is the same as in Example 3a. The total amount of lactide recovered by the lactide synthesis experiment was 45 g, which was smaller than lactide obtained in Example 3a. As a result of analysis of the composition of recovered lactide by nuclear magnetic resonance analysis ($^1$H-NMR), lactide contained 21 g of impurities including water, lactic acid, a linear lactic acid dimer and the like, and the impurity amount was larger than lactide obtained in Example 3a.

Example 4

Lactide Purification Step (Operation Procedures)

Figure 8:
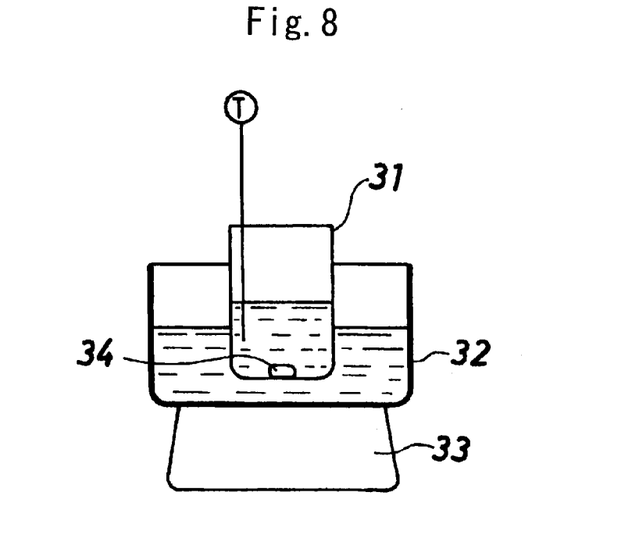
FIG. 8 is a diagram showing a lactide purification equipment used in a lactide purification process.

FIG. 8 shows a lactide purification equipment used in the lactide purification process. The condition and results of the lactide purification step are shown in Table 6. The operation procedures are shown below.

(1) Lactide obtained in Example 3a is used as a raw material. Lactide used as a raw material is a mixture of racemic lactide and meso lactide as shown in Table 6. Lactide also contains lactic acid and a linear lactic acid dimer as impurities.

(2) 100 g of lactide as a raw material is placed in a glass beaker (31) having a capacity of 200 mL.

(3) The beaker (31) is immersed in an oil bath (32), and lactide is heated to 130° C. for melting the raw material completely. The temperature of lactide is measured with a thermometer T. Lactide under heating is well stirred by rotating a stirring bar (34) with a stirrer (33).

(4) After confirming that lactide is completely melted, the temperature of the oil bath (32) is set at 65° C., and allowed to stand for approximately 1 hour.

(5) Lactide is separated into a solid phase and a liquid phase, and only the solid phase is taken out. The solid phase thus taken out is rinsed with propanol.

(6) Lactide thus rinsed with propanol is again completely melted by heating to 130° C.

(7) After confirming that lactide is completely melted, the temperature of the oil bath (32) is set at 75° C., and allowed to stand for approximately 1 hour.

(8) Lactide is separated into a solid phase and a liquid phase, and only the solid phase is taken out. The solid phase thus taken out is rinsed with propanol.

(9) Lactide thus rinsed with propanol is again completely melted by heating to 130° C.

(10) After confirming that lactide is completely melted, the temperature of the oil bath (32) is set at 95° C., and allowed to stand for approximately 1 hour.

(11) Lactide is separated into a solid phase and a liquid phase, and only the solid phase is taken out. The solid phase thus taken out is rinsed with propanol.

(Results)

The condition and results are shown in Table 6.

TABLE 6

| | | Operation condition | | Results | | |
| | | | | Lactide composition | | |
| | | Number of rinsing operations | Temperature maintained ° C. | Total amount g | Racemic lactide g | Meso lactide g | Others (e.g., water, lactic acid and linear lactic acid dimer) g |
|---|---|---|---|---|---|---|---|
| Example 4 | raw material | | | 100 | 45 | 30 | 20 |
| | first time | | 65 | 65 | 41 | 24 | 0 |
| | second time | | 75 | 35 | 33 | 2 | 0 |
| | third time | | 95 | 25 | 25 | 0 | 0 |

Lactide used for purification is one synthesized in Example 3a, and the composition thereof is 45 wt % of racemic lactide, 30 wt % of meso lactide and 20 wt % of others (e.g., water, lactic acid and a linear lactic acid dimer).

Lactide as a raw material was completely melted at 130° C., then cooled to 65° C., allowed to stand for approximately 1 hour, and rinsed with propanol. The amount of lactide that was recovered in the first melting and crystallization operation was 65 g. As a result of analysis of the composition of recovered lactide by nuclear magnetic resonance analysis ($^1$H-NMR), lactide contained 41 g of racemic lactide and 24 g of meso lactide. Water, lactic acid, a linear lactic acid dimer and the like are substantially not contained.

Lactide thus obtained was subjected to the second melting and crystallization operation, and the amount of lactide thus recovered was 35 g. As a result of analysis of the composition of lactide by nuclear magnetic resonance analysis ($^1$H-NMR), lactide contained 33 g of racemic lactide and 2 g of meso lactide.

Lactide thus obtained was subjected to the third melting and crystallization operation, and the amount of lactide thus recovered was 25 g. As a result of analysis of the composition of recovered lactide by nuclear magnetic resonance analysis ($^1$H-NMR), lactide contained 25 g of racemic lactide and substantially no meso lactide.

Example 5

Polymerization Step of Stereocomplex Polylactic Acid

In Example 5a, racemic lactide purified in Example 4 was used as a raw material, and salen-aluminum complexes shown by C1, C2 and C3 below were used as a catalyst.

C1

C2

C3

(Preparation of Catalyst)

In a test tube having been substituted with nitrogen, 0.5 mmol of a ligand shown by L1 below and 5.0 mL of toluene are placed, and the ligand is dissolved. The solution is cooled to 0° C., to which 0.7 g (0.5 mol) of trimethylaluminum was added, and the temperature thereof is returned to room temperature, followed by stirring for approximately 1 hour, thereby preparing the catalyst.

L1

(Polymerization of Polylactic Acid)

In a test tube having been substituted with nitrogen, 7,200 mg (50.0 mmol) of racemic lactide and 0.5 mmol of benzyl alcohol as an initiator are placed, to which 45 mL of toluene is added, followed by well stirring for dissolving racemic lactide. The catalyst solution is added to the resulting solution for initiating polymerization of lactide. The solution is heated to 70° C., and the reaction time is 6 hours.

(Results)

Figure 9:
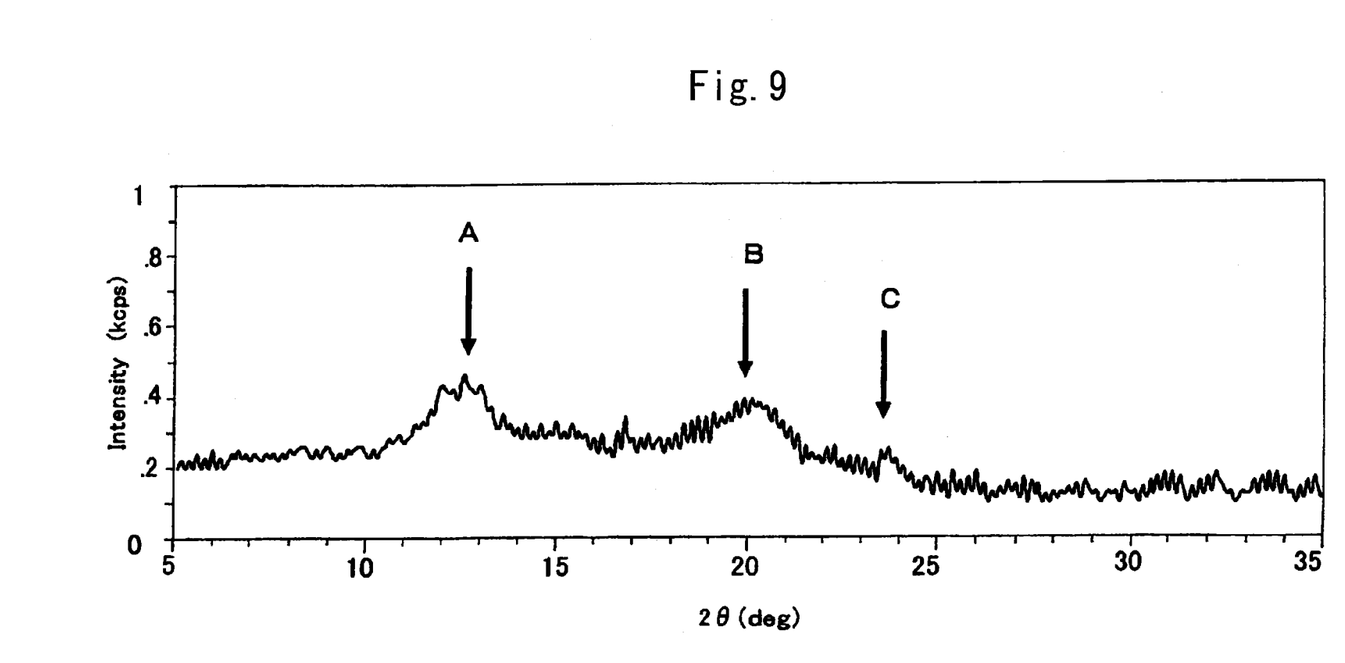
FIG. 9 is a diagram showing an X-ray diffraction spectrum of stereocomplex polylactic acid synthesized from glycerin.

The X-ray diffraction spectrum of the resulting polylactic acid is shown in FIG. 9. In FIG. 9, peaks were found at 2θ=12°, 21° and 24°. It is known that a stereocomplex of polylactic acid has characteristic peaks at 2θ=12°, 21° and 24°. Therefore, it was confirmed that polylactic acid obtained in Example 5a formed a stereocomplex (Ikeda, Y; Jamshidi, K.; Tuji, H.; Hyon, S. H., Macromolecules, 1987, 20, 904).

Figure 10:
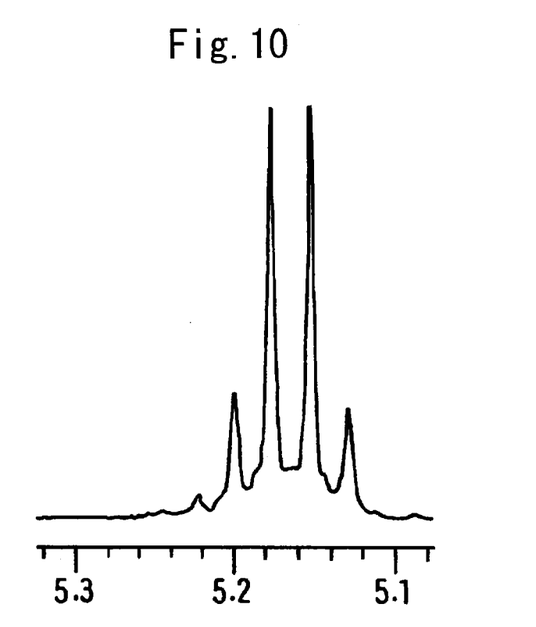

The $^1$H-NMR spectrum in the methine group region of the resulting polylactic acid is shown in FIG. 10. A quartet of the methine group is clearly found. It is understood therefrom that polylactic acid thus polymerized is stereocomplex polylactic acid, which is constituted by a polymer containing only L-lactic acid bonded and a polymer containing only D-lactic acid bonded and has s regular structure.

The properties of polylactic acid obtained in Example 5a are summarized in Table 7. The weight yield of polylactic acid obtained was 93 wt %. The number average molecular weight of polylactic acid obtained measured with a gel permeation chromatography (GPC) analyzer was 14,000. The melting point of polylactic acid obtained measured with a differential scanning calorimeter (DSC) was 192° C. The melting point of poly-L-lactic acid constituted only by L-lactic acid or poly-D-lactic acid constituted only by D-lactic acid is approximately 175° C., and thus it is understood that polylactic acid thus obtained is enhanced in thermal stability.

It is said that the melting point of stereocomplex polylactic acid formed of pure poly-L-lactic acid and poly-D-lactic acid is approximately 225° C., but the melting point of stereocomplex polylactic acid produced in Example 5a is lower than 225° C. It is considered that this is because a small amount of D-lactic acid is mixed in the molecular chain of poly-L-lactic acid (or a small amount of L-lactic acid is mixed in the molecular chain of poly-D-lactic acid), and thus the stereoregularity thereof is partially broken, thereby decreasing the melting point slightly.

In Example 5b, a ligand shown by L2 below was used. The reaction time for polymerization was 0.4 hour.

L2

The properties of polylactic acid obtained in Example 5b are summarized in Table 7.

The weight yield of polylactic acid obtained was 95 wt. %. The number average molecular weight of polylactic acid obtained measured with a gel permeation chromatography (GPC) analyzer was 10,000. The melting point of polylactic acid obtained measured with a differential scanning calorimeter (DSC) was 171° C.

In Example 5c, a ligand shown by L3 below was used. The amounts of the catalyst C3 and benzyl alcohol as an initiator were decreased to 0.25 mmol, and the reaction time for polymerization was increased to 19 hours. The other condition is the same as in Example 5a.

L3

The properties of polylactic acid obtained in Example 5c are summarized in Table 7.

The weight yield of polylactic acid obtained was 90 wt %. The number average molecular weight of polylactic acid obtained measured with a gel permeation chromatography (GPC) analyzer was 23,000. The melting point of polylactic acid obtained measured with a differential scanning calorimeter (DSC) was 207° C.

In Example 5d, so-called bulk polymerization using no toluene solvent was performed. No toluene solvent was used, C3 was used as a catalyst, the reaction temperature was 130° C., and the reaction time was 0.5 hour. The other condition is the same as in Example 5a.

The properties of polylactic acid obtained are summarized in Table 7. The weight yield of polylactic acid obtained was 98 wt %. The number average molecular weight of polylactic acid obtained measured with a gel permeation chromatography (GPC) analyzer was 12,000. The melting point of polylactic acid obtained measured with a differential scanning calorimeter (DSC) was 160° C. By the bulk polymerization, the melting point of polylactic acid polymerized was slightly lowered, but the reaction time was largely shortened.

Figure 11:
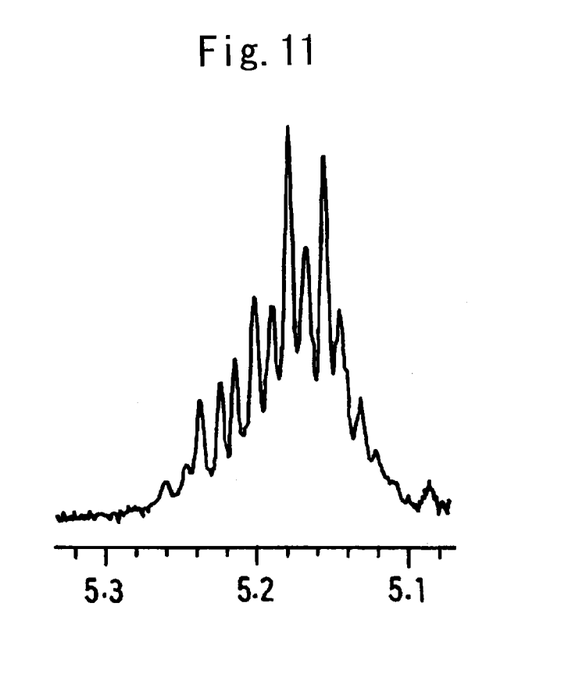
FIG. 11 is a diagram showing a $^1$H-NMR spectrum in the methine group region of polylactic acid obtained in Comparative Example 1.

In Comparative Example 1, aluminum isopropoxide (Al(O-i-Pr)$_3$) was used as a catalyst, and the polymerization time was 3 hours. The other condition is the same as in Example 5a. The $^1$H-NMR spectrum in the methine group region of the resulting polylactic acid is shown in FIG. 11. A quartet of the methine group is not clearly found, and thus it is conjectured that polylactic acid thus polymerized is polylactic acid having a random structure, in which only L-lactic acid and D-lactic acid are randomly bonded.

The weight yield of polylactic acid obtained was 88 wt %. The number average molecular weight of polylactic acid obtained measured with a gel permeation chromatography (GPC) analyzer was 10,000. Polylactic acid thus obtained was an amorphous (random structure) polymer and thus showed no melting point.

TABLE 7

| | | Polymerization Condition | | | | Properties of polylactic acid | | |
| --- | --- | --- | --- | --- | --- | --- | --- | --- |
| | Catalyst | Lactide/ catalyst mol/mol | Polymerization solvent | Reaction temperature ° C. | Time hr | Yield wt % | Number average molecular weight Mn — | Melting point Tm ° C. |
| Example 5a | C1 | 100 | toluene | 70 | 6.0 | 93 | 14,000 | 192 |
| Example 5b | C2 | 100 | toluene | 70 | 0.4 | 95 | 10,000 | 171 |
| Example 5c | C3 | 50 | toluene | 70 | 19.0 | 90 | 23,000 | 207 |
| Example 5d | C3 | 100 | none (bulk polymerization) | 130 | 0.5 | 98 | 12,000 | 160 |
| Comparative Example 1 | Al(O—i—Pr)$_8$ | 100 | toluene | 70 | 3.0 | 88 | 10,000 | <50 |

DESCRIPTION OF SYMBOLS 1 lactic acid production step
2 lactic acid purification step
3 lactide production step
4 lactide purification step
5 polylactic acid production step

The invention claimed is:

1. A method for producing stereocomplex polylactic acid, comprising:
   (1) reacting glycerin with sodium hydroxide in high-temperature and high-pressure water to produce a racemic sodium lactate aqueous solution;
   (2) recovering racemic lactic acid by separating sodium from the racemic sodium lactate aqueous solution;
   (3) dimerizing the racemic lactic acid to produce a lactide mixture containing meso lactide and racemic lactide;
   (4) recovering racemic lactide by separating meso lactide from the mixture; and
   (5) polymerizing the racemic lactide with a salen-metal complex as a catalyst to produce stereocomplex polylactic acid, wherein the salen-metal complex is:

wherein R1 and R2 each represent hydrogen, an alkyl group having from 1 to 6 carbon atoms, an alkoxy group having from 1 to 6 carbon atoms, a halogen group, a silyl group, an aryl group having from 6 to 18 nuclear carbon atoms, or a methoxymethyl group; R3 represents a divalent aliphatic hydrocarbon group having from 2 to 6 carbon atoms; and M represents Al, Fe, Ti or Y.

2. The method according to claim 1, wherein (1) is performed in such a manner that glycerin and sodium hydroxide are dissolved in water to form an aqueous solution, and the aqueous solution is maintained under high-temperature and high-pressure condition of a temperature in a range of from 250 to 350° C. and a pressure in a range of from 5 to 15 MPa.

3. The method according to claim 1, wherein (2) is performed in such a manner that the racemic sodium lactate aqueous solution is made acidic and is made in contact with an organic solvent to extract racemic lactic acid to the organic solution, and then the organic solvent is evaporated to recover racemic lactic acid.

4. The method according to claim 3, wherein the organic solvent is selected from the group consisting of propanol, butanol, methyl acetate, triethylamine and methyl ethyl ketone.

5. The method according to claim 1, wherein (3) is performed in such a manner that an oligomer of lactic acid as a precursor is formed by dehydration condensation of racemic lactic acid, the oligomer is then depolymerized and cyclized to form a lactide mixture containing meso lactide and racemic lactide, and the lactide mixture is taken out of the reaction system as vapor.

6. The method according to claim 5, wherein the oligomer as a precursor is formed under condition of a temperature of from 100 to 200° C. and a pressure of from 10 to 80 kPa.

7. The method according to claim 5, wherein the lactide is formed under condition of a temperature of from 150 to 250° C. and a pressure of from 0.5 to 5 kPa.

8. The method according to claim 1, wherein (4) is performed by a melting and crystallization method that utilizes a difference in melting point between racemic lactide having a melting point of 118° C. and meso lactide having a melting point of 60° C.

9. A stereocomplex polylactic acid synthesized from glycerin, the stereocomplex polylactic acid being produced by the method according to claim 1.

10. A stereocomplex polylactic acid synthesized from glycerin, the stereocomplex polylactic acid being produced by the method according to claim 2.

11. A stereocomplex polylactic acid synthesized from glycerin, the stereocomplex polylactic acid being produced by the method according to claim 3.

12. A stereocomplex polylactic acid synthesized from glycerin, the stereocomplex polylactic acid being produced by the method according to claim 4.

13. A stereocomplex polylactic acid synthesized from glycerin, the stereocomplex polylactic acid being produced by the method according to claim 5.

14. A stereocomplex polylactic acid synthesized from glycerin, the stereocomplex polylactic acid being produced by the method according to claim 6.

15. A stereocomplex polylactic acid synthesized from glycerin, the stereocomplex polylactic acid being produced by the method according to claim 7.

16. A stereocomplex polylactic acid synthesized from glycerin, the stereocomplex polylactic acid being produced by the method according to claim 8.

* * * * *